United States Patent
Thakur (10) Patent No.: US 6,839,368 B2
(45) Date of Patent: Jan. 4, 2005

(54) DIPOLAR ORGANIC MATERIALS PRODUCING HIGHLY EFFICIENT LASER-LIKE EMISSION

(76) Inventor: Mrinal Thakur, 1309 Gatewood Dr., No. 1703, Auburn, AL (US) 36830

(*) Notice: Subject to any disclaimer, the term of this patent is extended or adjusted under 35 U.S.C. 154(b) by 80 days.

(21) Appl. No.: 09/811,002

(22) Filed: Mar. 16, 2001

(65) Prior Publication Data
US 2002/0034201 A1 Mar. 21, 2002

Related U.S. Application Data

(60) Provisional application No. 60/190,256, filed on Mar. 17, 2000.

(51) Int. Cl.$^7$ ............................................... H01S 3/14
(52) U.S. Cl. .............................. 372/39; 372/1; 372/36; 372/51; 372/52; 372/53
(58) Field of Search ............................ 372/1, 36, 39, 372/51, 52, 53

(56) References Cited

U.S. PATENT DOCUMENTS

| | | | | |
|---|---|---|---|---|
| 3,774,121 A | * | 11/1973 | Ashkin et al. ................. | 372/53 |
| 4,377,635 A | * | 3/1983 | Mifune et al. ................ | 430/564 |
| 4,933,948 A | * | 6/1990 | Herkstroeter ................ | 372/53 |
| 5,231,533 A | * | 7/1993 | Gonokami et al. .......... | 359/328 |
| 5,543,960 A | * | 8/1996 | Carrig et al. ................ | 359/326 |
| 5,554,220 A | * | 9/1996 | Forrest et al. .............. | 117/102 |
| 5,610,932 A | * | 3/1997 | Kessler et al. ............... | 372/39 |
| 5,741,595 A | * | 4/1998 | Wada et al. ................. | 428/426 |
| 5,754,572 A | * | 5/1998 | Pinto et al. .................... | 372/20 |
| 6,141,367 A | * | 10/2000 | Fan et al. ...................... | 372/53 |
| 6,289,027 B1 | * | 9/2001 | Lawrence et al. ............. | 372/6 |
| 6,406,647 B1 | * | 6/2002 | Thakur ........................ | 252/582 |
| 6,509,099 B1 | * | 1/2003 | Urata et al. .............. | 428/423.1 |

* cited by examiner

Primary Examiner—Minsun Oh Harvey
Assistant Examiner—Delma R. Flores Ruiz
(74) Attorney, Agent, or Firm—Thomas, Kayden, Horstemeyer & Risley, L.L.P.

(57) ABSTRACT

High-efficiency laser-like emission at low thresholds in dipolar organic materials upon pulsed optical excitation, without using any external mirrors. Unusually high conversion efficiencies and low thresholds in laser-like emission have been observed in the solutions of organic molecular salts having large dipole moments and specific dye molecules having high photoluminescence efficiencies. Pumped with frequency-doubled pulses from a Nd:YAG laser, conversion efficiencies in the range of 15–40% were achieved without incorporation of external mirrors. The threshold pump energies for such emission have been observed to be low (<8 µJ). The spectrally narrowed output beam was found to have low divergence, high degree of polarization, and pulse-width less than that of the excitation pulses (50 picoseconds). The exceptionally low threshold (<1 µJ) and high energy conversion efficiencies observed in molecular salts have been attributed to the large excited-state dipole moment of these noncentrosymmetric molecules favoring strong cooperative (laser-like) emission in spite of small photoluminescence quantum efficiencies.

22 Claims, 13 Drawing Sheets

| Name | Chemical Formula |
|---|---|
| Styrylpyridinium cyanine dye (SPCD) |  |
| 4'-dimethylamino-*N*-methyl-4-stilbazolium tosylate (DAST) |  |
| 4'-diethylamino-*N*-methyl-4-stilbazolium tosylate (DEST) |  |
| 4'-dimethylamino-*N*-methyl-4-stilbazolium iodide (DASPI) |  |

| Abbreviated Name | $\lambda_{peak}$ (nm) | Linewidth (nm) | Conversion Efficiency (%) |
|---|---|---|---|
| SPCD | 620 | 10 | 40 |
| DAST | 610 | 9 | 35 |
| DEST | 617 | 14 | 20 |
| DASPI | 616 | 10 | 40 |

FIGURE 13

| Material | Solvent | $\lambda_{pump}$ (nm) | $\lambda_{PL}$ (nm) | PL % Efficiency | Energy Threshold (μJ/pulse) | Final Linewidth (nm) | Conversion Efficiency (%) |
|---|---|---|---|---|---|---|---|
| DTTC[a] (ref. 1) | Methanol | 694 | 798 | >50 | - | 13-18 | 3 |
| Coumarin 47[b] (ref. 2) | Ethanol | 355 | 451 | >70 | 200 | - | 2.8 |
| Coumarin (ref. 2) | Ethanol | 355 | 439 | 72 | 200 | - | 2.3 |
| TOP-PPV[b] (ref. 2) | Hexane | 355 | 449 | 80-90 | 100 | 7 | 6.8 |
| MEH-PPV[b] (ref. 3) | Xylene/CHCl$_3$ | 532 | 600 | large | 180 | 7 | 0.5 |
| DCM[a] ($10^{-3}$ mol/l) | Methanol | 532 | 641 | 60-70 | 8 | 10 | 25 |
| R6G[a] ($10^{-3}$ mol/l) | Methanol | 532 | 570 | ~70 | 1.5 | 10 | 30 |
| SPCD[a] (0.1 mol/l) | Methanol | 532 | 620 | 0.3 | <1 | 10 | 40 |

[a]Measured without any external mirrors.
[b]Measured with an external resonator cavity.

DIPOLAR ORGANIC MATERIALS PRODUCING HIGHLY EFFICIENT LASER-LIKE EMISSION

This application claims benefit of Provisional 60/190,256. Filed Mar. 17, 2000.

FIELD OF THE INVENTION

The present invention relates generally to the sources of electromagnetic energy, and in particular, to the strong cooperative alignment in dipolar organic media upon pulsed optical excitation resulting in highly efficient mirrorless laser-like emission.

BACKGROUND OF THE INVENTION

There has been considerable interest in mirrorless spectrally narrowed laser-like emission from organic dyes and conjugated polymers. An early observation of such laserlike emission occurring in organic dyes was made by Mack (Appl. Phys. Lett. 15, 166 (1969)). Using short-pulse optical excitation of several polymethine cyanine dyes (cryptocyanine, 1',1-diethyl-2,2'-dicarbocyanine iodide (DDI), and 3,3'-diethylthiatricarbocyanine iodide (DTTC)), Mack had obtained spectrally narrowed directional emission having typical linewidth of 13–18 nm with an energy conversion efficiency of up to about 3 percent. Following this work, several other groups reported experimental (U. Ganiel, A. Hardy, G. Neumann, and D. Treves, IEEE J. Quantum Elec. QE-11, 881 (1975), C. S. Wang, W. H. Cheng, C. J. Hwang, W. K. Burns, and R. P. Moeller, Appl. Phys. Lett. 41, 587 (1982)) and theoretical (L. Allen and G. I. Peters, Phys. Lett. 31A, 95 (1970), L. W. Casperson and A. Yariv, IEEE J. Quantum Elec. QE-8, 80 (1972), L. W. Casperson, J. Appl. Phys. 48, 256 (1977)) investigation of spectral narrowing without feedback of the emitted radiation.

Glessner et al. (J. Appl. Phys. 62, 5 (1987)) reported amplified spontaneous emission (ASE) in the spectral range of 1.0–1.34 microns from an iodine filled cell utilizing a YAG laser pumped dye laser system as the excitation source, achieving about 1% conversion efficiency. However, later they achieved conversion efficiency of 8.3% at an elevated temperature and pressure conditions (U.S. Pat. No. 4,905,247 (1990)).

Significant advancement has been made in recent years in spectrally narrowed light emission using solid films of conjugated polymers. Frolov et al. reported mirrorless lasing in thin films of poly(2,5-dioctyloxy-p-phenylenevinylene) (DOO-PPV), which they identified as superradiance (Jpn. J. Appl. Phys. 35, L1371 (1996)), or emission due to the formation of local cavities via scattering (OSA Annual Meeting, Paper ThG5, Santa Clara, September. 26–30 (1999)). Laser-like emission from such solid films usually can not continue beyond a maximum of 10,000 shots.

Hide et al. observed low gain narrowing threshold (1 $\mu J$ per pulse) in sub-micrometer thick films of semiconducting polymers based on waveguide structures (Science 273, 1833 (1996)). Superradiant emission in neat films of an alternating copolymer poly[dimethylsilylene-p-phenylenevinylene-(2,5-di-n-octyl-p-phenylene)-vinylene-p-phenylene] (Si-PPV) was observed by Brouwer et al. (Adv. Mater. 8, 935 (1996)). Spectral narrowing in optically pumped poly(p-phenylenevinylene) (PPV) films was reported by Denton et al. (Adv. Mater. 9, 547 (1997)).

Laser action was also observed in solutions of several conjugated materials placed in conventional resonator cavities (D. Moses, Appl. Phys. Lett. 60, 3215 (1992) and U.S. Pat. No. 5,237,582 (1993), H. Brouwer, V. V. Krasnikov, A. Hilberer, J. Wildeman, Appl. Phys. Lett. 66, 3404 (1995), W. Holzer, A. Penzkofer, S. Gong, A. Bleyer, and D. Bradley, Adv. Mater. 8, 974 (1996)).

Two-photon pumped up converted lasing has been demonstrated in dye doped polymer waveguides (A. Mukherjee, Appl. Phys. Lett. 62, 3423 (1993)), and solid matrices (He et al., IEEE J. Quantum Elec. 32, 749 (1996), Prasad et al., U.S. Pat. No. 5,912,257 (1999)). The present invention relates to laser-like emission using single-photon excitation.

In terms of applications, the major weaknesses of mirrorless laser-like emission have been the small conversion efficiency (<8%) and high pump energy thresholds (>10 $\mu J$). Applications have not materialized because of these weaknesses. Clearly, appropriate materials that can lead to high conversion efficiencies (>15%) and lower thresholds (<5 microjoules) in mirrorless lasing are highly desired. Such a device would provide a low-cost source of short-pulse (picosecond) laser-like emission for various commercial and research related applications. These mirrorless devices would not require expensive optical elements, alignment accessories, and the extensive time needed for alignment and thus would substantially reduce the cost. The fact that dipolar structure may result in large conversion efficiencies and require low thresholds were not identified and reported in the literature so far. The present invention involves the invention that dipolar molecules which photoluminesce produce laser-like emission with exceptionally high conversion efficiency and at low pump-energy thresholds.

SUMMARY OF THE INVENTION

The present invention demonstrates mirrorless laser-like emission with exceptionally large conversion efficiencies at low thresholds using dipolar organic materials. Strong cooperative emission without a resonant cavity is due to the macroscopic dipoles arising from coherent interactions of the photo-excited species in the presence of an intense optical field. Hence strongly dipolar molecules should lead to a more extensive order in the dipole moments (or phasing), leading to a significantly enhanced efficiency in cooperative emission. It has been discovered that organic molecular salts having large ground-state and excited-state dipole moments are excellent candidates for mirrorless laser applications despite very small PL efficiencies. High-efficiency emission in the mirrorless configuration in organic dyes having moderate dipole moments but large PL efficiencies has also been observed.

Highly efficient directional emission in the spectral range of 600–620 nm is demonstrated upon excitation of solutions of the organic salts, such as, styrylpyridinium cyanine dye (SPCD), 4'-dimethylamino-N-methyl-4-stilbazolium tosylate (DAST), 4'-diethylamino-N-methyl-4-stilbazolium tosylate (DEST), and 4'-dimethylamino-N-methyl-4-stilbazolium iodide (DASPI), by second-harmonic pulses from a Nd:YAG laser. Large electro-optic coefficients were previously measured in the first two of these salts organized into noncentrosymmetric single-crystals (M. Thakur, J. Xu, A. Bhowmik, and L. Zhou, Appl. Phys. Lett. 74, 635 (1999), T. Yoshimura, J. Appl. Phys. 62, 2028 (1987), A. K. Bhowmik, A. Mishra, S. Sodah, and M. Thakur, Bulletin of Am. Phys. Soc. 44, 1431 (1999)). The dyes with high PL efficiencies that have been investigated for mirrorless laser-like emission include rhodamine 6G and DCM.

The threshold excitation pulse-energy for laser-like emission from the strongly dipolar salts is less than 1 $\mu J$ per pulse, while the energy conversion efficiency in the range of 20–40% has been obtained despite a PL efficiency of only ~0.3%. The threshold for mirrorless lasing in the highly luminescent dipolar dyes are slightly larger and the energy conversion efficiencies somewhat smaller than that for the salts.

Highly directional output beam was obtained from the mirrorless lasers, with the half-apex angle of divergence less than 10 mrad. The output emission was frequency-doubled using a commercially available type-I phase-matched β-barium borate (BBO) crystal to generate 305–310 nm radiation. The pulse duration was measured by background-free second-harmonic generation (SHG) intensity autocorrelation technique to be ~32 ps, while the excitation pulse-width was ~80 ps. Thus, the present invention provides a cost-effective frequency shifter for short laser pulses without requiring high-precision optical components.

Mirrorless solid-state lasing devices are also disclosed which are constructed using the dipolar organic salts doped into solid matrices of poly(methyl methacrylate) (PMMA).

Spectrally narrowed directional emission with typical bandwidth of 10 nm is achieved.

The present invention has the following characteristics:
1. A dipolar organic material producing highly efficient laser-like emission at low thresholds without external mirrors.
2. A highly efficient and low-threshold mirrorless lasers (producing laser-like emission without mirrors) comprising:
   (a) organic materials producing highly efficient laser-like emission at low thresholds without external mirrors in solution as active media; and
   (b) a pump laser projecting the excitation beam into the active media.
3. These organic molecules have large dipole moments as active media.
4. These dipolar organic molecules are dyes which have large photoluminescence efficiencies as the active media.
5. These strongly dipolar organic molecular salts have the following chemical formula as the active media:

where R and R' are the same or different, and comprise a moiety selected from the group consisting of alkyl, substituted alkyl, benzyl, and substituted benzyl, and Y is an anion.
6. One of the preferred salts is where both R and R' are —CH$_3$, and Y$^-$ is CH$_3$OSO$_3^-$.
7. Another of the preferred salts is where both R and R' are —CH$_3$, and Y$^-$ has the following formula:

8. Another of the preferred salts is where both R and R' are —CH$_3$, and Y is I.
9. A further preferred salt is where both R and R' are —CH$_2$CH$_3$, and Y$^-$ has the following formula:

10. Dipolar organic dyes, such as rhodamine 6G (R6G) and DCM, have large photoluminescence efficiencies as the active media.
11. A pump laser is used at a wavelength where the active material has strong absorption.
12. A pump laser emitting optical pulses having pulse width shorter than the duration (about <100 picoseconds) of the excitation pulses is preferred.
13. A pump source producing 1–100 picosecond pulses frequency-doubled by a nonlinear optical crystal such as potassium dihydrogen phosphate (KDP) is preferred.
14. The mirrorless laser preferably has threshold excitation pulse-energy less than about 1 microjoule with a line excitation of about 5 mm$^2$ area.
15. The mirrorless laser preferably yields energy conversion efficiencies of more than about 15%.
16. The mirrorless laser may yield energy conversion efficiencies of up to about 40%.
17. The mirrorless ultraviolet short-pulse emitting laser of this invention is preferably constructed by frequency-doubling the output of the laser using a nonlinear optical
18. A mirrorless laser emitting picosecond pulses at 300–310 nm may be constructed by frequency-doubling the output of the lasers.
19. The mirrorless lasers of this invention are stable under continuous operation for at least about 5 million shots.
20. The mirrorless solid-state laser may be constructed using strongly dipolar organic molecules doped into solid polymeric matrices.
21. The mirrorless solid-state laser may be constructed using the dipolar organic molecules doped into solid matrices of poly(methyl methacrylate) (PMMA).

Other objects, features, and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
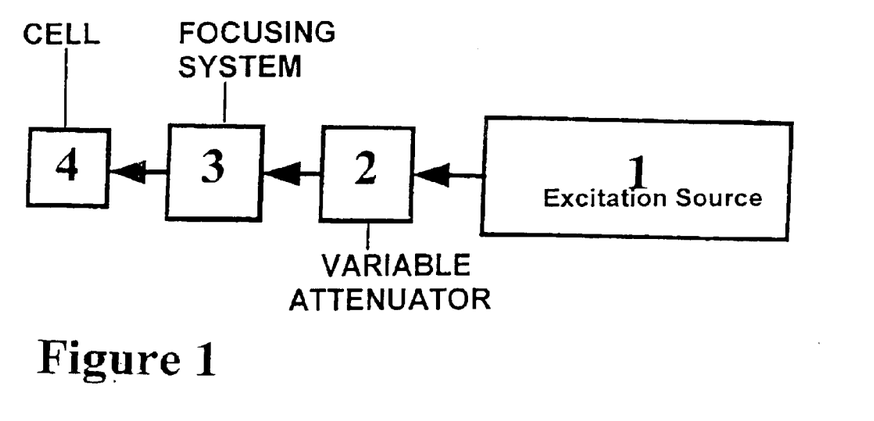
FIG. 1 shows the schematic diagram of the mirrorless lasing device (1), excitation source (2), variable attenuator (3), focusing system (4), cell containing the active material.

A schematic diagram of the mirrorless lasing device is shown in FIG. 1. The device comprises a main body containing the emissive active media, an appropriate focusing system, and an excitation source, typically a laser producing short optical pulses at a wavelength where the active material has strong absorption. The body containing the active media could be a typical dye cell of convenient dimensions. A quartz cuvette with square cross-section (1 cm×1 cm) was used. A frequency-doubled Nd:YAG laser producing ~80 ps pulses at 10 Hz repetition rate at 532 nm wavelength was used as the source of the excitation radiation. Pulses from the Nd:YAG laser, frequency-doubled by a potassium dihydrogen phosphate (KDP) crystal, were focused onto the dye cell using the combination of a spherical and a cylindrical lens to form a line excitation of ~5 mm² area. The energy of the input pulses was controlled using a variable attenuator. The energy of the input and output pulses from the Nd:YAG laser and the dye cell was measured using pyroelectric detectors (DigiRad Model R-752 Laser Radiometer with P-444 probe). An optical multichannel analyzer (ISA Model 270M) was used to measure the emission spectra collected at an angle normal to the pump beam as a function of the incident pulse-energy.

The characteristics of the output radiation from the device critically depends on the emissive material placed inside the cell. The active media used in conventional lasers must have very high photoluminescence (PL) quantum efficiencies. In fact, the widely used laser dyes have PL efficiencies approaching unity. However, we have discovered that strongly dipolar organic molecular materials provide mirrorless spectrally narrowed laser-like emission with very large efficiency at low threshold excitation energy despite, as will be elaborated, relatively low PL efficiencies. Several organic salts with large ground-state and excited-state dipole moments, listed in Table 1, were investigated. Mirrorless laser-like emission has also been obtained from highly luminescent dyes with moderate dipole moments, such as rhodamine 6G and DCM. Hence, the active material must possess either large dipole moment or high PL efficiency.

Figure 11:
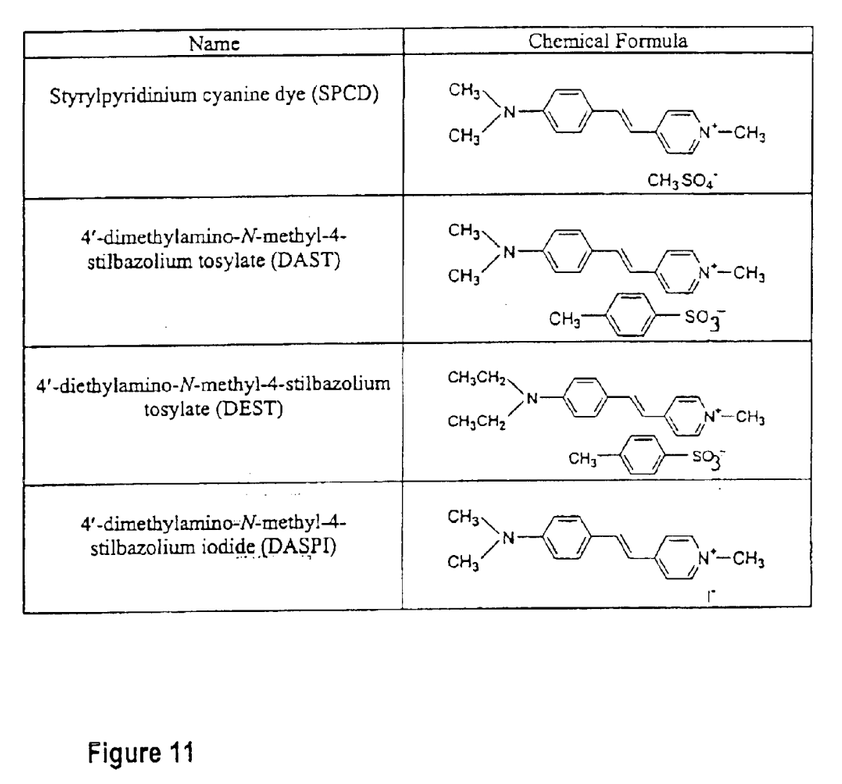
FIG. 11 shows a table of the chemical formula of the molecular salts investigated.

The compounds of the present invention can be generally stated as being:

where R and R' are alkyl, substituted alkyl, benzyl, and substituted benzyl, and Y is an anion. The chemical formula of the molecular salts investigated is shown in FIG. 11.

The absorption spectrum of a dilute solution ($1.36 \times 10^{-5}$ mol/L) of a typical salt SPCD in methanol, measured using a Hitachi U-2000 spectrophotometer, showed that the absorption peak is at 480 nm. The extinction coefficient, $\epsilon$, was determined to be $5.43 \times 10^4$ $Lmol^{-1}cm^{-1}$ at the absorption peak, which corresponds to an absorption cross section, $\sigma$, of 2.07 Å².

Figure 2:
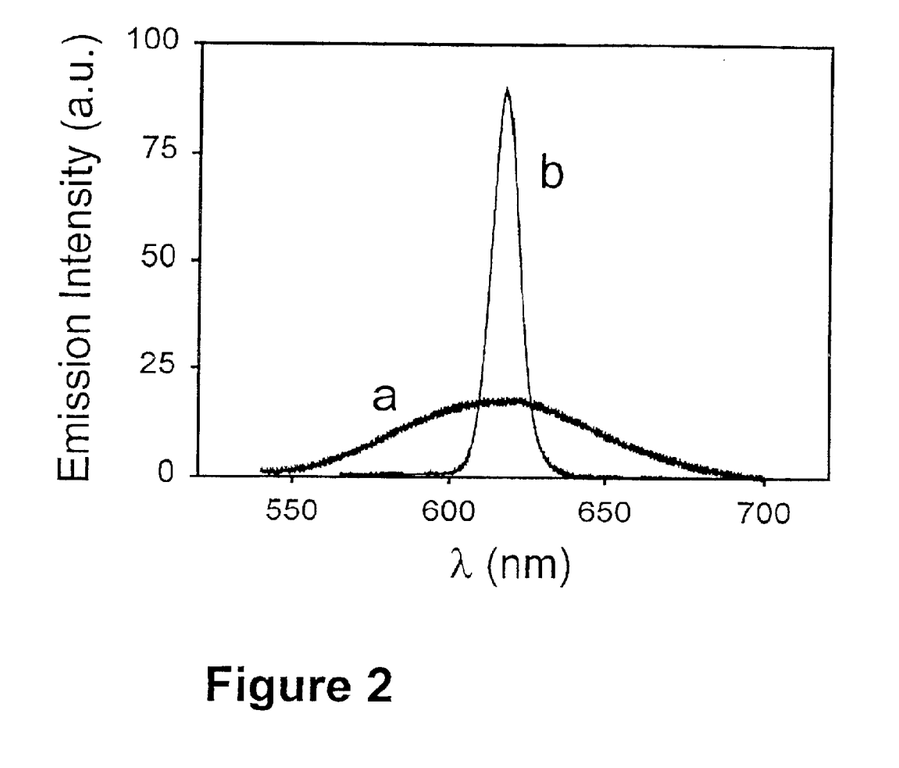
FIG. 2 illustrates the emission spectra of SPCD: a) low-energy photoluminescence spectrum, and b) spectrum obtained with 10 μJ excitation pulse-energy. The excitation area was about 5 mm$^2$. The PL and narrowed spectra have FWHM of 77 nm and 10 nm, respectively.
Figure 3:
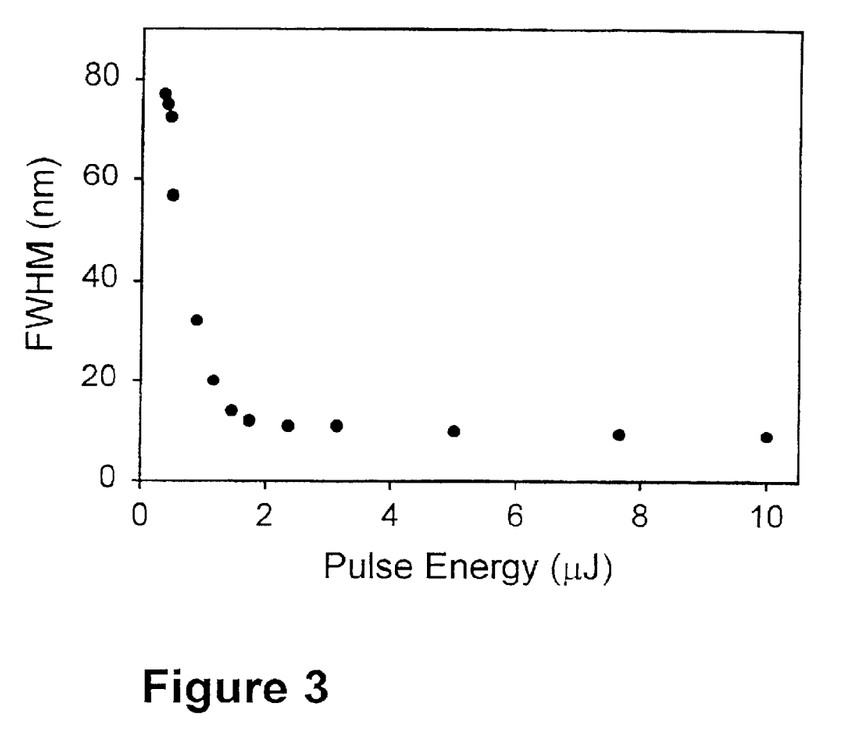
FIG. 3 illustrates the evolution of the spectral line-width of emission from SPCD as a function of incident pulse energy. The threshold excitation pulse-energy for spectral narrowing is less than 1 μJ.

A broad photoluminescence (PL) spectrum with full-width at half-maximum (FWHM) of 77 nm centered at 620 run was obtained with low energy excitation of the SPCD solution. Thus the Stokes shift is as large as 140 nm, which leads to negligible reabsorption of the emitted radiation. The FWHM of the emission spectra decreased significantly as the energy of the excitation-pulse was increased. The threshold pump-energy for spectral narrowing was observed to be less than 1 µJ, beyond which a gain-narrowed peak centered at 620 nm superseded the rest of the emission band. At higher energies the tail of the PL band completely disappeared. The emission spectra for incident pulse-energy beyond threshold was found to have a FWHM of 10 nm. FIG. 2 shows the low-energy photoluminescence spectrum and the narrowed spectrum obtained with 10 µJ excitation pulses. The evolution of emission line-width as a function of the pump energy is shown in FIG. 3.

Figure 4:
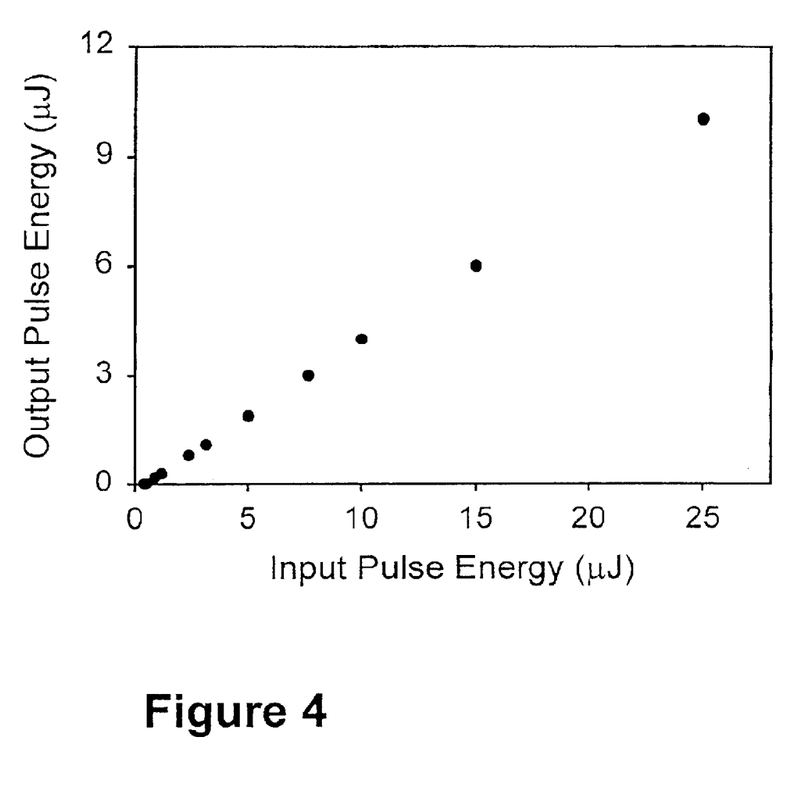
FIG. 4 shows the output pulse energy obtained from mirrorless lasing in SPCD as a function of the energy of the pump pulses. The slope efficiency beyond the threshold excitation energy is about 40%.
Figure 5:
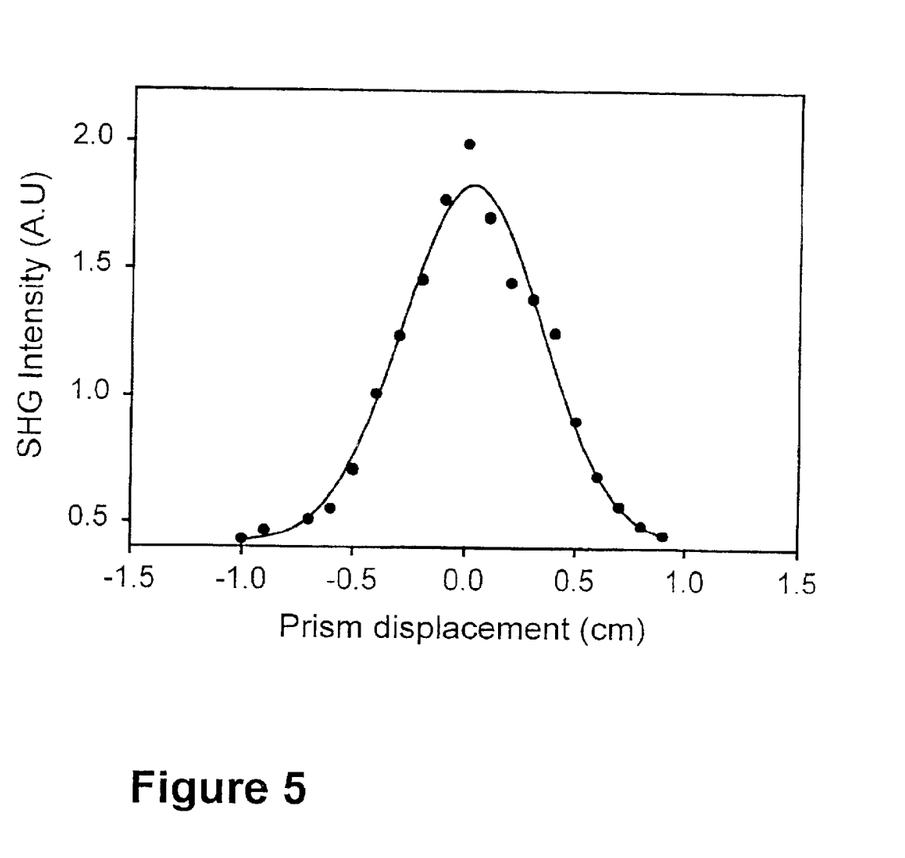
FIG. 5 shows the autocorrelation traces of the excitation pulses from the Nd:YAG laser with pulsewidth ~80 ps and the output pulses from the SPCD mirrorless laser with pulsewidth ~32 ps.

The output laser-like beam beyond the threshold excitation energy was polarized and with a small divergence. The half-apex angle of divergence of the beam was estimated to be less than 10 mrad, indicating high directionality. A measurement of the polarization of the beam indicated a ratio of intensities along and normal to the excitation polarization direction to be approximately 3:1, whereas the PL emission at lower energy was found to be unpolarized. The plot of the output pulse energy obtained from mirrorless lasing in the 0.1 molar solution of SPCD versus the input pulse energy is given in FIG. 4. It indicates that the threshold input energy for cooperative emission is indeed less than 1 µJ. The output energy from the dye cell increased linearly with the increase in input pulse energy, as expected in the case of lasing. The pulse duration of the output radiation was measured by the background-free second-harmonic generation (SHG) intensity autocorrelation technique. A commercially available BBO crystal was used to frequency-double the laser-like beam to generate radiation in the spectral range of 305–310 nm. The pulsewidth was measured to be ~32 picoseconds, while the duration of the excitation pulses was ~80 picoseconds. FIG. 5 shows the autocorrelation traces of the excitation pulses from the Nd:YAG laser and the output pulses from the mirrorless laser employing SPCD as the active material.

Figure 6:
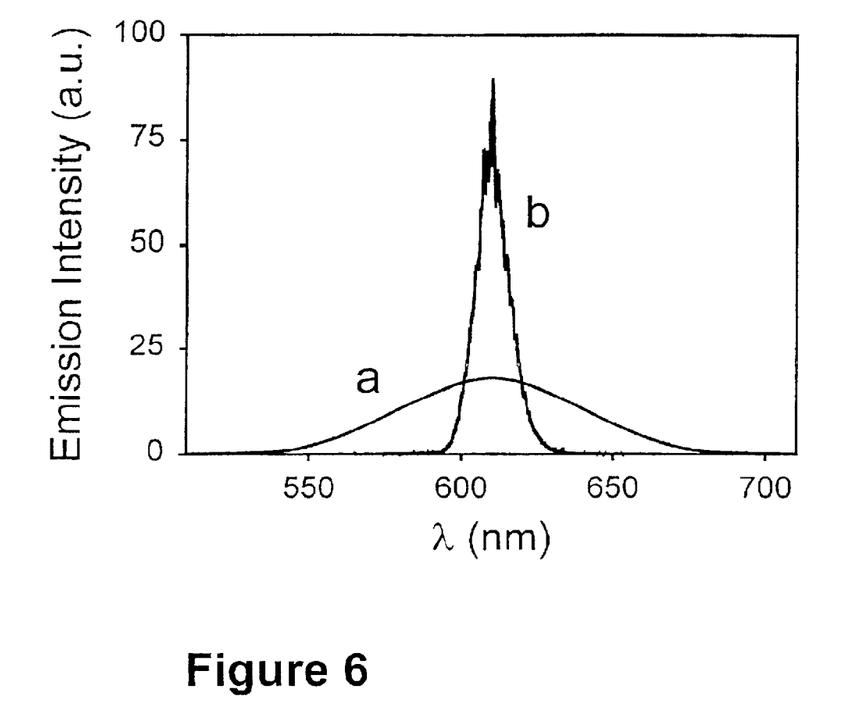
FIG. 6 illustrates the emission spectra of DAST: a) low-energy photoluminescence spectrum, and b) narrowed spectrum obtained with 15 µJ excitation pulse-energy.
Figure 7:
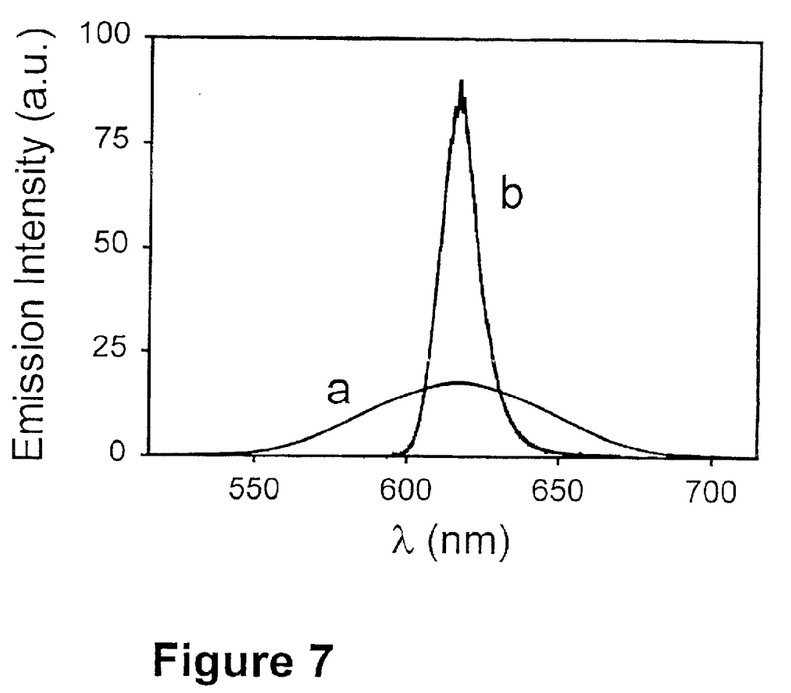
FIG. 7 illustrates the emission spectra of DEST: a) low-energy photoluminescence spectrum, and b) narrowed spectrum obtained with 15 µJ excitation pulse-energy.
Figure 8:
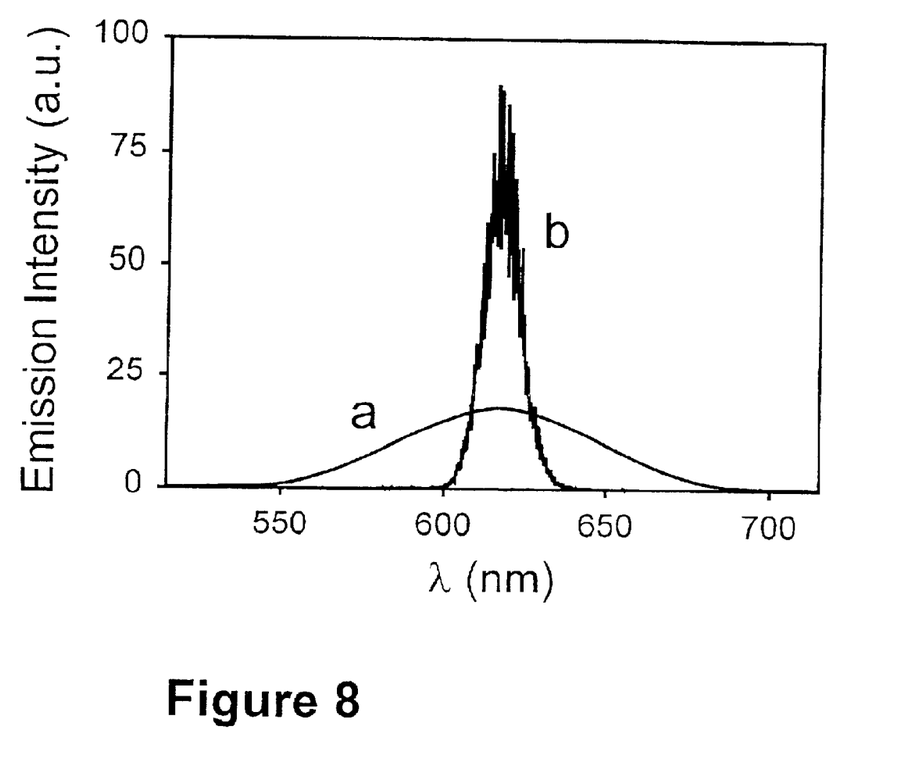
FIG. 8 illustrates the emission spectra of DASPI: a) low-energy photoluminescence spectrum, and b) narrowed spectrum obtained with 15 µJ excitation pulse-energy.
Figure 12:
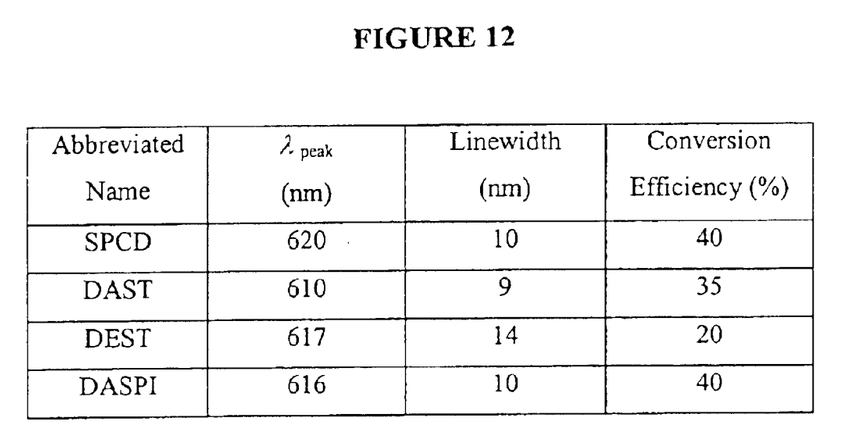
FIG. 12 shows a table of the characteristics of the mirrorless laser-like emission from the molecular salts.

Output pulses of as high as 80 µJ energy were obtained from mirrorless laser-like emission from SPCD when pumped with 200 µJ input pulses, indicating an energy conversion efficiency of 40%. Table II lists the peak emission wavelength and conversion efficiencies obtained using several organic molecular salts. Very large efficiencies, up to 40%, were achieved by using the molecular salts. The threshold excitation pulse-energy for spectrally narrowed laser-like emission from all these strongly dipolar organic materials was measured to be less than 1 µJ. FIGS. 6, 7, and 8 illustrate the PL spectra and the narrowed emission spectra of DAST, DEST, and DASPI, respectively. The emission characteristics of the mirrorless lasers constructed using the molecular salts are given in Characteristics of the mirrorless laser-like emission from the molecular salts are shown in FIG. 12.

Figure 9:
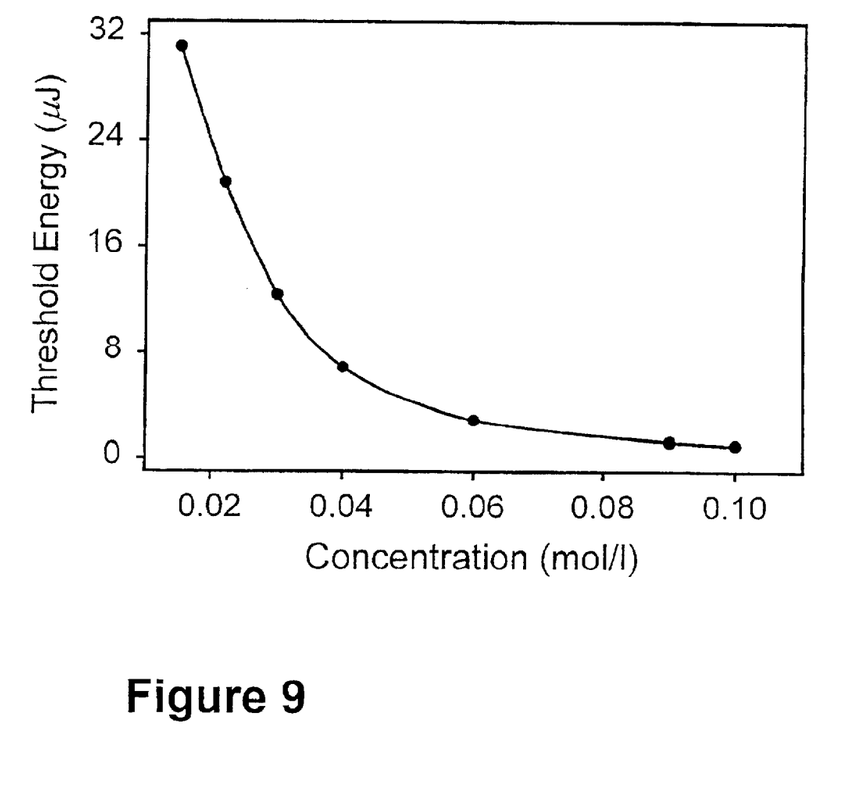
FIG. 9 illustrates the threshold input pulse energy for mirrorless lasing in SPCD solution in methanol versus the concentration. The minimum threshold pulse energy is <1 µJ at 0.1 mol/L.

The quantum efficiencies of photoluminescence (PL), φ, of the solution of the dipolar salts in methanol were measured on a Perkin-Elmer LS-50B luminescence spectrometer. Using R6G as the standard, the maximum φ of SPCD and DAST was estimated to be 3%. At the concentration for which 40% conversion is achieved, is even lower (<0.3%). In spite of relatively poor PL efficiencies, cooperative emission in these strongly dipolar organic materials yields exceptionally large conversion efficiencies beyond the threshold excitation pulse-energy. This demonstrates the role of molecular dipole moment in the cooperative emission process. Organic salt molecules having large dipole moments in the excited state leads to such unique results. For a pump energy below the threshold the material behaves similar to a typical dye molecule with a relatively low conversion efficiency. However, as pump energy or the optical field is increased, the excited-state dipoles and the total induced dipole moments form a correlated or ordered state which decays to the ground state with a significantly enhanced oscillator strength. FIG. 9 shows the threshold energy as a function of the concentration of SPCD in methanol. The threshold input pulse energy for spectral narrowing was observed to decrease with increased concentration of the SPCD solution. This further elucidates the dipolar order made easier by an increase in the number density of the strongly dipolar excited species in the optical path.

For the organic dyes having large photoluminescence efficiencies but smaller dipole moments, such as rhodamine 6G (R6G), the maximum efficiency that can be reached is slightly smaller. For rhodamine 6G the maximum efficiency is 30% at $10^{-3}$ mol/l concentration. For DCM, the maximum conversion efficiency is 25% at the concentration of $10^{-3}$ mol/l. The lowest threshold excitation pulse-energy for spectral narrowing in R6G is 1.5 µJ, and for DCM is 8 µJ.

Figure 10:
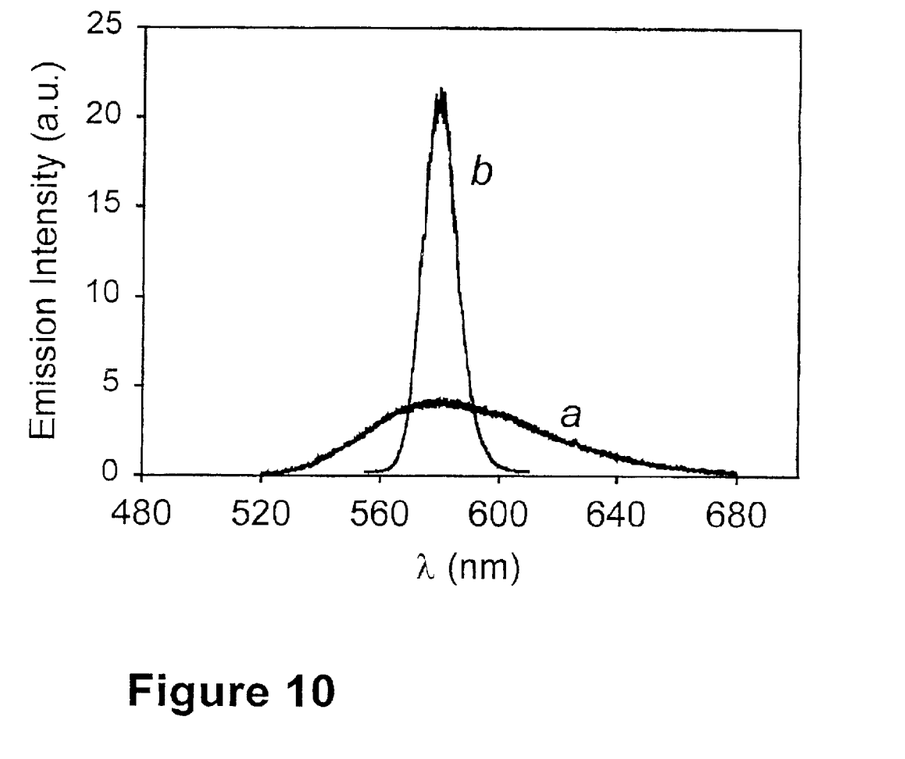
FIG. 10 illustrates the emission spectra of a mirrorless solid-state laser constructed by doping SPCD in a PMMA matrix: a) low-energy photoluminescence spectrum, and b) narrowed spectrum obtained with 10 µJ excitation pulse-energy. The concentration of SPCD in PMMA was $5 \times 10^{-3}$ mol/L.

Mirrorless solid-state lasing devices are also disclosed which are constructed using the dipolar organic salts doped into solid matrices of poly(methyl methacrylate) (PMMA). Spectrally narrowed directional emission with typical bandwidth of 10 nm is achieved. FIG. 10 illustrates the emission spectra of an SPCD doped PMMA solid film. The concentration of SPCD in PMMA was $5\times10^{-3}$ mol/L. The evolution of the spectral linewidth of emission was measured as a function of the excitation pulse energy for this device. The threshold excitation energy was about 4 µJ per pulse, beyond which the emission spectral width decreased from about 65 nm to about 10 run. The threshold energy for spectrally narrowed emission was strongly dependent on the concentration of SPCD in the PMMA matrix. The threshold was 25 µJ per pulse for a concentration of $1\times10^{-3}$ mol/L, and 4 µJ per pulse for a concentration of $5\times10^{-3}$ mol/L, both with a line excitation area of 5 mm². The emission characteristics also strongly depended on the thickness of the films.

In accordance with the present invention, highly efficient mirrorless lasing devices using dipolar organic molecular materials at very low threshold pump pulse energy have been constructed. The active material should possess either large dipole moment or high photoluminescence efficiency. Significant narrowing of the spectral linewidth was observed without using external mirrors. The threshold energy for spectral narrowing in the strongly dipolar molecular salts was measured to be less than 1 µJ, and energy conversion efficiency as high as 40% was achieved. The output beam was strongly polarized and highly directional with a low divergence. The extremely large Stokes shift of these materials ensures insignificant self-absorption of the emitted radiation. The low threshold and high energy conversion efficiency are attributed to the large excited state dipole moment in this molecule. The dipole moments of the ground and excited states of electro-optic organic molecules have previously been calculated (*Nonlinear Optical Properties of Organic Molecules and Crystals*, D. S. Chemla and J. Zyss, Eds., Academic Press, New York (1987)). The excited state of the molecule is essentially formed via an electron transfer mechanism and has a large dipole moment. In the presence of a strong optical field these dipoles would form a highly correlated system leading to efficient cooperative emission. The high conversion in mirrorless lasing in spite of low photoluminescence quantum efficiency is a unique characteristic resulting from an exceptionally high degree of dipolar order (or phasing) facilitated by the excited-state dipole moments. Mirrorless laser-like emission with reasonably large conversion efficiencies was also achieved in organic dyes having high photoluminescence efficiencies and moderate dipole moments, such as rhodamine 6G and DCM. The device can be used as an inexpensive frequency shifter for short laser pulses. The generation of deep ultraviolet radiation by frequency-doubling the output beam has also been demonstrated.

The invention will be further described in connection with the following examples, which are set forth for purposes of illustration only. Parts and percentages appearing in such examples are by weight unless otherwise stipulated.

EXAMPLES

Example 1

In one embodiment of the present invention, the molecular salt styrylpyridinium cyanine dye (SPCD) was used, the chemical formula of which is given in FIG. 11. The cation in this molecule is a stilbazolium chromophore, whereas the anion is methoxy-sulphonate. SPCD was synthesized using the procedure similar to that reported in literature (S. R. Marder et al., Chem. Mater. 6, 1137 (1994)). The threshold excitation pulse energy for mirrorless laser-like emission in this dipolar material was measured to be less than 1 µJ. Energy conversion efficiency as high as 40% was achieved at the concentration of 0.1 mol/l. The emission peak was at 620 nm.

Example 2

In another embodiment of the present invention, the molecular salt 4'-dimethylamino-N-methyl-4-stilbazolium tosylate (DAST) was used. The chemical formula of DAST is given in Table I. The cation in this molecule is a stilbazolium chromophore, whereas the anion is toluene sulphonate. DAST was synthesized using the procedure similar to that reported in literature (S. R. Marder et al., Chem. Mater. 6, 1137 (1994)). The threshold excitation pulse energy for mirrorless laser-like emission in DAST was less than 1 µJ, and energy conversion efficiency up to 35% was achieved. The emission peak was at 610 nm.

Example 3

In another embodiment of the present invention, the molecular salt 4'-diethylamino-N-methyl-4-stilbazolium tosylate (DEST) was used. The chemical formula of DEST is given in Table I. The cation in this molecule is a stilbazolium chromophore, whereas the anion is toluene sulphonate. DEST was synthesized using the procedure similar to that reported in literature (S. R. Marder et al., Chem. Mater. 6, 1137 (1994)). The threshold excitation pulse energy for mirrorless laser-like emission in DEST was less than 1 µJ, and energy conversion efficiency up to 20% was achieved. The emission peak was at 617 n.

Example 4

In another embodiment of the present invention, the molecular salt 4'-dimethylamino-N-methyl-4-stilbazolium iodide (DASPI) was used. The chemical formula of (DASPI) is given in FIG. 11. The cation in this molecule is a stilbazolium chromophore, whereas the anion is iodide. DASPI was synthesized using the procedure similar to that reported in literature (S. R. Marder et al., Chem. Mater. 6, 1137 (1994)). The threshold excitation pulse energy for mirrorless laser-like emission in DEST was less than 1 µJ, and energy conversion efficiency up to 40% was achieved. The emission peak was at 616 nm.

Example 5

In another embodiment of the present invention, the highly efficient and widely used laser dye rhodamine 6G (R6G) was employed. R6G was purchased from Lambda Physik. The threshold excitation pulse energy for mirrorless laser-like emission in R6G was 1.5 µJ, and energy conversion efficiency up to 30% was achieved at the concentration of $10^{-3}$ mol/l. The emission peak was at 570 nm.

Example 6

Figure 13:
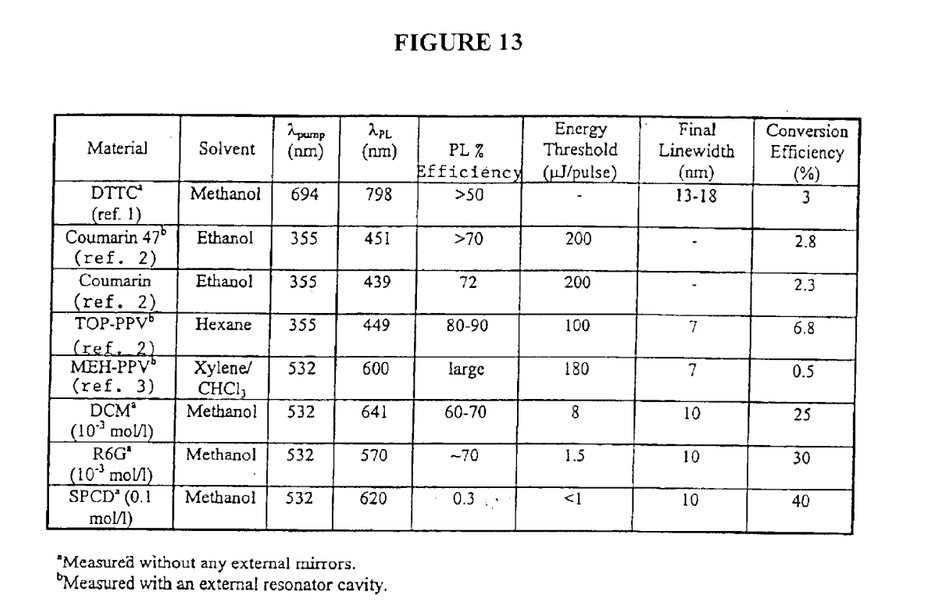
FIG. 13 shows a table of the comparison of the performances of SPCD and a few other efficient laser dyes and conjugated materials.

In another embodiment of the present invention, the highly efficient and widely used laser dye DCM was employed. DCM was purchased from Lambda Physik. The threshold excitation pulse energy for mirrorless laser-like emission in DCM was 8 µJ, and energy conversion efficiency up to 25% was achieved at the concentration of $10^{-3}$ mol/l. The emission peak was at 641 nm. See FIG. 13.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications or publications referred to herein (and in the attached "References Cited" document) are incorporated by reference their entirety.

REFERENCES CITED

Other Publications

1. M. E. Mack, Appl. Phys. Lett. 15, 166 (1969).
2. H. Brouwer, V. V. Krasnikov, A. Hilberer, J. Wildeman, Appl. Phys. Lett. 66, 3404 (1995).
3. D. Moses, Appl. Phys. Lett. 60, 3215 (1992).

What is claimed is:

1. A highly efficient and low-threshold mirrorless laser (producing laser-like emission without mirrors), comprising:

a. at least one strongly dipolar organic molecular salt having the following chemical formula as the active media:

where R and R' are the same or different, and comprise a moiety selected from the group consisting of alkyl, substituted alkyl, benzyl, and substituted benzyl, and Y⁻ is an anion organic materials producing highly efficient laser-like emission at low thresholds without external mirrors in solution as active media; and b. a pump laser projecting the excitation beam into the active media.

2. The mirrorless laser of claim 1 wherein R and R' are —CH₃ and Y is CH₃OSO₃⁻.

3. The mirrorless laser of claim 1 wherein R and R' are —CH₃, and Y⁻ has the following formula:

4. The mirrorless laser of claim 1 wherein R and R' is —CH₃, and Y⁻ is I⁻.

5. The mirrorless laser of claim 1 wherein R and R' are —CH₂CH₃, and Y⁻ has the following formula:

6. The mirrorless laser of claim 1 wherein the dipolar organic molecular salt (a) is doped into solid polymeric matrices.

7. The mirrorless laser of claim 6 wherein the solid polymeric matrices is composed of poly(methyl methacrylate) (PMMA).

8. The mirrorless laser of claim 1 in which the pump laser (b) is capable of emitting optical pulses having a pulse shorter than the duration (about <100 picoseconds) of the excitation pulses.

9. The mirrorless laser of claim 1 which uses potassium dihyrogen phosphate (KDP) as nonlinear optical crystal to increase the frequency output of the laser.

10. The mirrorless laser of claim 1 which has a threshold excitation pulse-energy of less than about 1 microjoule with a line excitation of about 5 mm² area.

11. The mirrorless lasers of claim 1 which uses β-barium borate (BBO) as a nonlinear optical crystal to increase the frequency of output of the laser.

12. A method for producing a laser-like emission without mirrors comprising: utilizing a pump laser for projecting an excitation beam into an active media consisting essentially of at least one strongly dipolar organic molecular salt having the following chemical formula:

a. where R and R' are the same or different, and comprise a moiety selected from the group consisting of alkyl, substituted alkyl, benzyl, and substituted benzyl, and Y is an anion organic material capable of producing highly laser-like emission at low thresholds without external mirrors in media.

13. The method of claim 12 wherein R and R' are —CH₃ and Y⁻ is CH₃OSO₃⁻.

14. The method of claim 12 wherein R and R' are —CH₃, and Y⁻ has the following formula:

15. The method of claim 12 wherein R and R' is —CH₃, and Y is I⁻.

16. The method of claim 12 wherein R and R' are —CH₂CH₃, and Y⁻ has the following formula:

17. The method of claim 12 wherein the dipolar organic molecular salt (a) is doped into solid polymeric matrices.

18. The method of claim 12 wherein the solid polymeric matrices is composed of poly(methyl methacrylate) (PMMA).

19. The method of claim 12 in which the pump laser emits optical pulses having a pulse shorter than the duration (about <100 picoseconds) of the excitation pulses.

20. The method of claim 12 which uses potassium dihydrogen phosphate (KDP) as a nonlinear optical crystal to increase the frequency output of the laser.

21. The method of claim 12 in which the laser produces a threshold excitation pulse-energy of less than about 1 microjoule with a line excitation of about 5 mm² area.

22. The method of claim 12 which uses β-barium borate (BBO) as a nonlinear optical crystal to increase the frequency of output of the laser.

* * * * *